(12) United States Patent
Lehman

(10) Patent No.: US 6,344,361 B1
(45) Date of Patent: Feb. 5, 2002

(54) METHOD OF DETECTING THE PRESENCE OF IMPURITIES, UNIT AND METHOD FOR VAPORIZING LIQUID, AND DOUBLE AIR-DISTILLATION COLUMN

(75) Inventor: Jean-Yves Lehman, Maisons Alfort (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/247,101

(22) Filed: Feb. 9, 1999

(30) Foreign Application Priority Data

Feb. 9, 1998 (FR) .............................................. 98 01477

(51) Int. Cl.$^7$ ................................................. G01N 1/18
(52) U.S. Cl. ........................... 436/178; 436/55; 436/50; 436/106; 436/116; 436/57; 62/651; 62/654; 62/656; 62/913; 73/61.41; 73/61.62; 73/61.71; 73/863.11; 73/863.12; 73/863.41; 201/3; 201/4; 201/1; 202/160; 203/40; 203/47

(58) Field of Search ............................ 436/55, 50, 106, 436/116, 67, 158; 62/651, 654, 656, 913; 73/61.41, 61.62, 61.71, 863.11, 863.12, 863.41; 201/3, 4, 1; 202/160; 203/40, 47

(56) References Cited

U.S. PATENT DOCUMENTS

| | | |
|---|---|---|
| 2,446,535 A | 8/1948 | Fausek et al. |
| 5,629,208 A | 5/1997 | Darredeau et al. |

*Primary Examiner*—Jill Warden
*Assistant Examiner*—Monique T. Cole
(74) *Attorney, Agent, or Firm*—Young & Thompson

(57) ABSTRACT

A film-type vaporizer in a vaporization enclosure, for example the upper column of a double air-distillation column, is associated with a measurement and analysis box where a polished surface and a spillway reconstruct the flow of liquid in the vaporizer in order to check for the absence of the deposition of impurities in the liquid that is to be evaporated. If deposition occurs, the impurities involved are quantified and analyzed and appropriate action taken on the settings of the machine.

16 Claims, 2 Drawing Sheets

METHOD OF DETECTING THE PRESENCE OF IMPURITIES, UNIT AND METHOD FOR VAPORIZING LIQUID, AND DOUBLE AIR-DISTILLATION COLUMN

FIELD OF THE INVENTORY

The present invention relates to methods and units for vaporizing liquids, particularly for distilling air.

BACKGROUND OF THE INVENTION

All gaseous mixtures that are to be separated, and in particular atmospheric air, contain numerous and varied impurities of varying volatility and in highly varying contents. Not being readily soluble, these impurities, alone or in combination, present risks of malfunctioning, particularly of explosion.

In the case of air-distillation apparatus, atmospheric air to be separated is purified prior to liquefaction in an adsorption-type purification unit which holds back almost all of the water, carbon dioxide and unsaturated hydrocarbon impurities present in the air.

This prepurification is not, however, sufficient, and it is therefore envisaged that it be supplemented by a system for reducing the impurities concentration by continuous cleaning and/or adsorption in the liquid phase, as described, for example, in document DE-A-1, 936,049.

What is more, when a perfectly identified and detectable difficult-to-remove impurity may pose a problem, then the measuring of the presence of this impurity in a critical region of the apparatus is advantageously envisaged, as described, for example, in the case of the impurity $N_2O$ in document U.S. Pat. No. 5,629,208 (Darredeau et al.).

It is nonetheless still the case that many impurities, for example temporary, local or unpredictable impurities, are not taken into account, existing purification devices allowing some of these to be held back but being relatively transparent in the case of others which, depending on their limits of solubility and of concentration, may be deposited on the heat-exchange surfaces of the apparatus, particularly the vaporizers.

To avoid this risk, use is made of bath-type vaporizers in which a thermosiphon allows a high flow rate of liquid to be circulated through the exchanger so as to thoroughly wash these surfaces. Use is also made of vaporizers known as falling film or liquid-film wetting vaporizers, in which the liquid to be vaporized is finely distributed at the upper part of the surface and trickles over this surface in thin films allowing a smaller temperature difference. To avoid the deposition of solid particles on the surface, care is taken to ensure that this surface is kept very wet, right down to the bottom of the vaporizer, by supplying it with a flow rate of liquid that is markedly higher than the flow rate vaporized, usually by resorting to the use of a recirculating pump. The latter does, however, have the drawback of concentrating the residual impurities in the liquid bath, that the filtration device in the aforementioned recirculation circuit may not be adequate to hold back.

SUMMARY OF THE INVENTION

The object of the present invention is to propose methods and devices that will make it possible, not to detect the presence of impurities in the liquid that is to be evaporated, but to detect any formation of depositions of impurities on the critical heat-exchange surfaces and therefore take rapid action to change the operating conditions of the plant and/or provide greater purification, at least temporarily, and/or shut down the plant.

In order to achieve this, according to one aspect of the invention, this invention proposes a method of detecting the presence of residual impurities in at least one stream of liquid intended to be at least partially vaporized in at lest one vaporizing unit, in which part of the stream entering the vaporizing unit is diverted so that at least part of it is directed onto a receiving surface that is held at a temperature slightly above the vaporization temperature of the liquid being monitored, and in which any formation of solid deposits on the surface is detected.

Typically, according to the invention, the amount of solid material deposited and the amount of diverted liquid vaporized on the surface are also measured, so as to establish, from correlations, the presence, nature and content of impurities during the period preceding these measurements.

Thus, whatever the quality of the purification operations performed upstream or locally, the absence of the formation of solid deposits on the receiving surface, which reconstructs on a small scale and in a directly accessible manner, the situation of the heat-exchange surface within the apparatus, demonstrates that under the prevailing operating conditions, the risks of the deposition or build up of undesired solid particles on the heat-exchange surface are zero. By contrast, whatever the impurity involved, whether or not it has been previously identified, the appearance of a deposition on the receiving surface indicates a risk condition that allows corrective measures to be taken swiftly.

Another subject of the present invention is a vaporizing unit that is appropriate for the implementation of the method, comprising, within an enclosure, at least one vaporizer, means of supplying the vaporizer with a stream of liquid to be vaporized, a circuit for diverting part of the stream to be vaporized, this circuit being connected to the supply means and comprising a means of spraying part of the diverted stream onto a receiving surface and means of detecting the formation of solid deposits on this surface.

Such a vaporizing unit can be readily implemented in numerous applications, possibly by making quick modifications to existing vaporizing units. It finds a particularly advantageous application in vaporizer-condensers at the base of the upper columns of double-column distillation devices, with simple gravity feed and/or fed at least partly by a recirculating pump.

Real-time checks for the absence of formation of deposits (or, in the other case, the appearance of such deposits) makes it possible to operate under perfectly reliable conditions, without having to resort to preventive measures that are not necessarily needed such as, for example, overwetting the vaporizer or running it at a high pressure. Thus, according to one aspect of the invention, it is possible to vaporize oxygen at a pressure not exceeding $3.5 \times 10^5$ Pa and to produce a double air-distillation column comprising, at the base of the upper column, a liquid-film wetting vaporizer that is entirely devoid of a recirculating pump.

BRIEF DESCRIPTION OF THE DRAWINGS

Other features and advantages of the present invention will emerge from the following description of embodiments, given by way of illustrative but non-limiting example, and made with reference to the appended drawings, in which:

In the description which will follow and in the drawings, elements which are identical or analogous bear the same reference numerals, possibly with indices.

FIG. 1 depicts diagrammatically, within an enclosure 1, a film vaporizer of the open type 2 receiving, under gravity, a spillway 24, a stream F of liquid to be vaporized. According to the invention, located in a box 3 mounted outside the enclosure 1, is an optically polished receiving surface 4 heated by a heating device 5 and over which there extends, like a spillway, the end of a small-section pipe 6 drawing off liquid from the stream F, typically in the distribution manifold above the vaporizer 2. The receiving surface 4 is monitored by an optical device 7, for example of the type viewed directly by an observer and/or advantageously of the type having a photoelectric detector analysing a signal of reflected light from a source 8 in the box 3. The mini-stream of gas flowing through the pipe 6 trickles, like the main stream F in the vaporizer 2, over the hot surface 4 where it vaporizes, the gas vaporized in the chamber 3 returning to the enclosure 1 along a gas-return pipe 9.

As explained above, it will be readily understood that the inspected surface of the receiving surface 4 very exactly reproduces the most severe conditions that exist in the vaporizer 2 which means that, as long as no deposition is seen on the surface 4, the vaporizer 2 can operate in a so-called partially dry operating mode, with a very limited flow rate of liquid at the lower part of the exchanger, down to 0% in the case of the production of gaseous oxygen, and that this can be so irrespective of the pressure in the enclosure 1, which pressure can even be below the values usually considered as being "threshold" pressures, for example below $3.5 \times 10^5$ Pa in the case of the vaporizing of oxygen.

Figure 1:
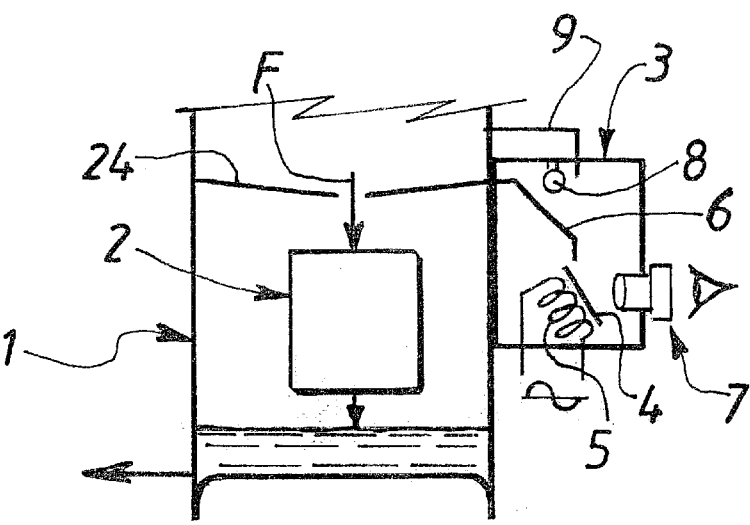
FIG. 1 is a diagrammatic view of a vaporizing unit according to the invention.
Figure 2:
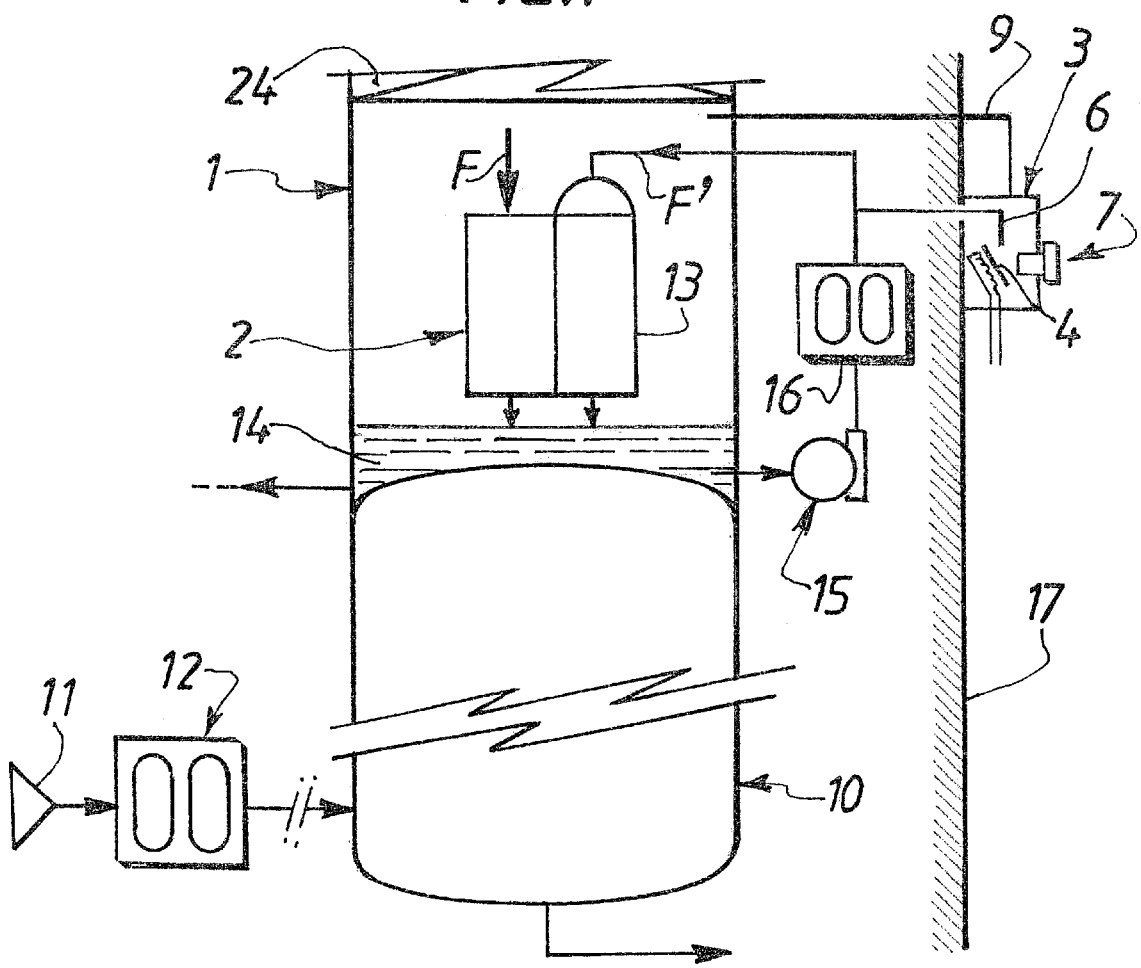
FIG. 2 is a diagrammatic view of one embodiment of a double air-distillation column according to the invention.

FIG. 2 illustrates one application of the invention to the production of a double air-distillation column for the production of oxygen.

This FIG. 2 shows a double column with an upper enclosure 1, known as the low-pressure column, and a lower enclosure known as the medium-pressure column 10, the latter being supplied by a compressor 11 with pressurized air that has been purified in a purification unit 12 of the adsorption type.

Placed in the bottom of the upper enclosure 1 is a double vaporizer-condenser consisting, in the example depicted, of an open vaporizer 2 receiving directly under gravity a stream of liquid that is to be vaporized F, like in the previous example, here associated with a closed vaporizer box 13 itself supplied with liquid to be vaporized F' recycled from the bath 14 at the bottom of the base by a recirculating pump 15. As mentioned above, a purification device of the type with solid adsorbent 16 is advantageously provided in the delivery circuit of the pump 15, in order to avoid the bath 14 becoming overenriched with impurities and to limit the risk that these impurities will be deposited in the vaporizer 13.

According to the invention, the tapping-off pipe 6 dripping onto the receiving surface 4 is in this case tapped off downstream of the purification device 16, the box 3 advantageously being mounted directly on the exterior wall, depicted as 17, of the cold box enclosing the double distillation column. Advantageously, a second box 3 may be provided, to represent the situation in the open vaporizer 2 by taking away some of the stream F, like in the example described above.

Figure 3:
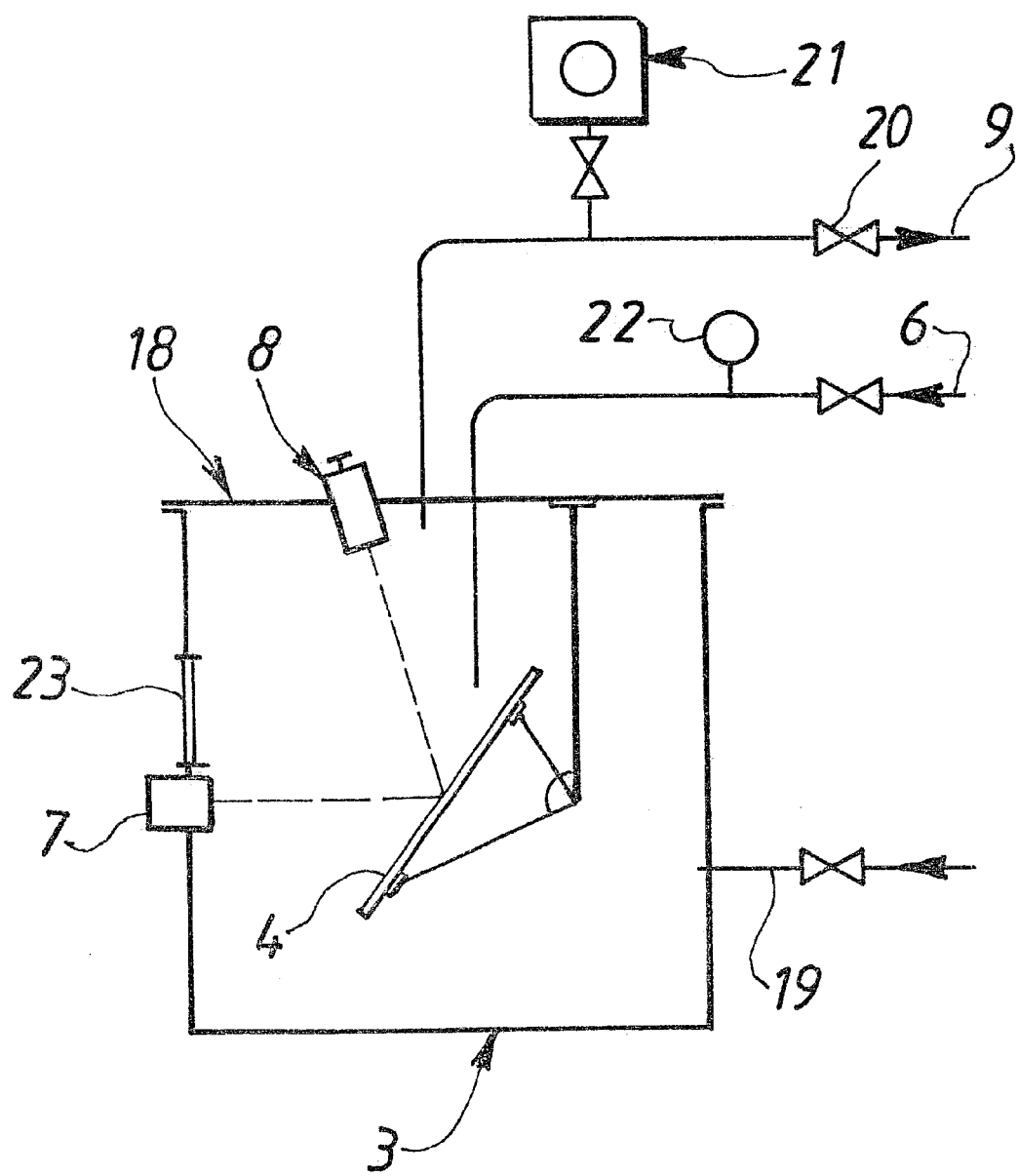
FIG. 3 is a diagrammatic view of a box for measuring and analysing deposits, according to the invention.

FIG. 3 depicts in greater detail a box 3 for analysing and measuring deposits. The box 3 comprises a removable lid 18 allowing access to the receiving surface 4 for taking and analysing the non-vaporizable deposits. The box comprises a pipe 19 for selectively conveying a clean gas for de-icing and the gas-return pipe 9 is equipped with a shut-off valve 20 and with an analyzer 21 for analysing the deposited impurities vaporized during the de-icing of the box. The capillary tube 6 along which the liquid arrives by gravity is also equipped with a flow detector 22 for measuring the amount of diverted liquid vaporized in the box and correlating it with the contents of impurities deposited in the, variable, period preceding the measurements. In FIG. 3, the light source 8 is a collimated source and the detection device comprises a photoelectric cell 7 and a window 23 for visual inspection. For enhancing the sensitivity and/or the collimation of the optical detection device, the polished receiving surface 4 may be curved, at least orthogonally to the light beam, for instance cylindrical and/or in the shape of a U or of a J.

Although the present invention has been described in relation to particular embodiments, it is not restricted thereto but, on the contrary, can be modified and varied in ways that will be obvious to the person skilled in the art, within the scope of the claims which follow.

What is claimed is:

1. Apparatus for detecting the presence of impurities able to form solid deposits present in at least one stream of liquid intended to be at least partially vaporized in at least one vaporizing unit, comprising:

means for diverting part of the stream entering the vaporizing unit, means for directing at least part of the diverted stream onto a receiving surface, means for holding said receiving surface at a temperature slightly above the vaporization temperature of the liquid reaching said surface, and means for detecting any formation of solid deposits on said surface.

2. A method of detecting the presence of impurities able to form solid deposits present in at least one stream of liquid supplied to at least one vaporizing unit to be at least partially vaporized therein, comprising the steps of:

diverting part of the stream of liquid entering the vaporizing unit;

directing at least part of the diverted stream onto a receiving surface that is held at a temperature slightly above the vaporization temperature of the liquid stream reaching the surface; and detecting any formation of solid deposits on the surface.

3. Method according to claim 2, wherein the liquid is a liquefied gas.

4. Method according to claim 3, wherein the liquid is a gas from air.

5. Method according to claim 4, wherein the liquid is oxygen.

6. Method according to claim 2, wherein the entire stream of liquid is vaporized in the vaporizing unit.

7. Method according to claim 6, wherein the vaporizing unit comprises at least one liquid-film wetting vaporizer.

8. Method according to claim 7, wherein the vaporizer is placed at the bottom of a distillation column.

9. Method according to claim 7, wherein the incoming stream of liquid drops under gravity from distillation section that is situated above the vaporizer.

10. Method according to claim 9, wherein the incoming stream of liquid is pumped from the gases of the upper column and injected into the vaporizer.

11. Method according to claim 10, wherein the pumped stream of liquid is purified as it leaves the pump and before it is diverted towards the receiving surface.

12. Method according to claim 11, wherein the pumped stream of liquid is purified by passing through at least one adsorbent bed.

13. Method for completely vaporizing a stream of liquid oxygen in a vaporizer, at least one portion which is not wetted by the liquid oxygen, wherein the method employs the detection method according to claim 6.

14. Method according to claim 13, wherein vaporization takes place at a pressure not higher than $3.5 \times 10^5$ Pa.

15. The method of claim 2, further comprising the step of measuring the amount of solid deposits on the surface.

16. The method of claim 2, further comprising the step of measuring the flow of the diverted liquid stream.

* * * * *